(12) United States Patent  
Epstein et al.

(10) Patent No.: US 10,955,592 B2  
(45) Date of Patent: Mar. 23, 2021

(54) MULTIPLEXING BACKLIGHT WITH ASYMMETRIC TURNING FILM

(71) Applicant: 3M INNOVATIVE PROPERTIES COMPANY, St. Paul, MN (US)

(72) Inventors: Kenneth A. Epstein, St. Paul, MN (US); Nicholas A. Johnson, Burnsville, MN (US); Michael E. Lauters, Hudson, WI (US); Shannon L. Siefken, Woodbury, MN (US); Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/346,647

(22) PCT Filed: Nov. 2, 2017

(86) PCT No.: PCT/US2017/059660  
§ 371 (c)(1),  
(2) Date: May 1, 2019

(87) PCT Pub. No.: WO2018/085497  
PCT Pub. Date: May 11, 2018

(65) Prior Publication Data  
US 2020/0057343 A1 Feb. 20, 2020

Related U.S. Application Data

(60) Provisional application No. 62/417,054, filed on Nov. 3, 2016.

(51) Int. Cl.  
*G02B 5/04* (2006.01)  
*F21V 5/08* (2006.01)  
(Continued)

(52) U.S. Cl.  
CPC ............. *G02B 5/04* (2013.01); *F21V 5/08* (2013.01); *G02F 1/1323* (2013.01); *G02F 1/133615* (2013.01)

(58) Field of Classification Search  
CPC ........... G02F 1/133615; G02F 1/1323; G02F 1/133606; G02F 2001/133607;  
(Continued)

(56) References Cited

U.S. PATENT DOCUMENTS 5,477,239 A * 12/1995 Busch ............... G02F 1/133615  
                                                              345/102  
6,799,859 B1 * 10/2004 Ida ....................... G02B 6/0036  
                                                              362/335

(Continued)

FOREIGN PATENT DOCUMENTS

| CN | 101251674 | 8/2008 |
| CN | 204347285 | 5/2015 |

(Continued)

OTHER PUBLICATIONS

International Search Report for PCT International Application No. PCT/US2017/059660, dated Apr. 14, 2018, 7 pages.

*Primary Examiner* — Shan Liu  
(74) *Attorney, Agent, or Firm* — Michael Stern

(57) ABSTRACT

The disclosure describes asymmetric turning films (ATFs) that may be used in conjunction with multiple light sources in a liquid crystal display assembly to provide multiple different characteristic output distributions of light. In some examples, the ATFs include a structured surface defining a plurality of microstructures having two or more faces with each face configured to reflect light in different directions. The microstructure may define a microstructure axis and an angle gradient characterizing the rotation of the microstructure axis across the structured surface of the ATF.

15 Claims, 7 Drawing Sheets

(51) Int. Cl.
  *G02F 1/13* (2006.01)
  *G02F 1/13357* (2006.01)

(58) Field of Classification Search
  CPC ....... G02F 1/1336; G02F 2001/133616; G02F 1/133504; G02F 1/133308; G02F 2001/133317; G02F 2001/133322; G02F 1/133605; G02F 2001/133626; G02B 5/04; G02B 5/0231; G02B 5/045; G02B 6/0088; G02B 6/005; G02B 6/0068; G02B 6/0073; G02B 6/0083; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 21/0032; G02B 21/06; G02B 21/16; G02B 2006/12083; G02B 2006/12085; G02B 2006/12088; G02B 2006/1209; G02B 2006/12092; G02B 2006/12095; G02B 6/0033; G02B 6/0035; G02B 6/0036; G02B 6/0038; G02B 6/004; G02B 6/0041; G02B 6/0043; G02B 6/0045; G02B 6/0046; G02B 6/0048; G02B 6/0051; G02B 6/0053; G02B 6/0055; G02B 6/0056; G02B 6/0058; G02B 6/006; G02B 6/0061; G02B 6/0063; G02B 6/0065; G02B 6/0066; G02B 6/007; G02B 6/0071; G02B 6/0075; G02B 6/0076; G02B 6/0078; G02B 6/10; G02B 6/102; G02B 6/105; G02B 6/107; G02B 6/122; G02B 6/1221; G02B 6/1223; G02B 6/1225; G02B 6/1226; F21V 5/08; G01N 21/62; G01N 21/6458; B82Y 20/00
  USPC ...................................... 349/61–68
  See application file for complete search history.

(56) References Cited

U.S. PATENT DOCUMENTS

| | | | |
|---|---|---|---|
| 7,855,763 B2 | 12/2010 | Yuuki | |
| 2005/0073625 A1* | 4/2005 | Daiku | G02F 1/133504 349/64 |
| 2006/0104089 A1* | 5/2006 | Feng | G02B 6/0061 362/608 |
| 2009/0190329 A1* | 7/2009 | Tsukada | G02B 5/0215 362/97.2 |
| 2009/0251408 A1* | 10/2009 | Kuroda | G02F 1/133615 345/156 |
| 2013/0249961 A1* | 9/2013 | Oki | G02B 30/27 345/690 |
| 2014/0286044 A1* | 9/2014 | Johnson | G02B 5/021 362/607 |
| 2016/0282542 A1* | 9/2016 | Seo | G02B 5/045 |
| 2017/0023725 A1* | 1/2017 | Oki | G02B 6/0038 |

FOREIGN PATENT DOCUMENTS

| | | | | |
|---|---|---|---|---|
| JP | 2015191181 | 11/2015 | | |
| WO | WO 2015-153329 | 10/2015 | | |
| WO | WO 2015-183604 | 12/2015 | | |
| WO | WO-2015183604 A1 * | 12/2015 | ....... | G02F 1/133615 |

* cited by examiner

MULTIPLEXING BACKLIGHT WITH ASYMMETRIC TURNING FILM

TECHNICAL FIELD

Asymmetric turning film for use in a liquid crystal display.

BACKGROUND

Turning films are used in many display and lighting applications to change the angular distribution of light. Turning films generally have features which operate by refracting and/or reflecting light. Turning films may be used in conjunction with light sources and liquid crystal displays to provide a desired light output.

Temporal multiplexing in display applications generally refers to providing non-continuous series of images through the same backlight architecture at a rate faster than the perceptible limit for human observation. The brain perceives the separate images as combined singular image.

SUMMARY

In some examples, the disclosure describes a display device that includes a first light source and a second light source having differently oriented light distributions; and an asymmetric turning film comprising a first major surface and a structured surface, where the first major surface defines a display axis extending perpendicular to the first major surface, and where the structured surface includes a plurality of microstructure pairs formed across the structured surface, where each of the plurality of microstructure pairs includes a first microstructure having a first face and a second face intersecting at a first crest, where the first microstructure defines a first microstructure axis extending from the first crest and equally splitting an angle between the first face and the second face, where the first microstructure axis and the display axis define a first angle ($\alpha$), and wherein the first face preferentially reflects light from the first light source and the second face preferentially reflects light from the second light source, and a second microstructure having a third face and a fourth face intersecting at a second crest, where the second microstructure defines a second microstructure axis extending from the second crest and equally splitting an angle between the third face and the fourth face second face, where the second microstructure axis and the display axis define a second angle ($\beta$), and where the third face preferentially reflects light from the first light source and the fourth face preferentially reflects light from the second light source. In some examples of the display device, the first microstructure and the second microstructure are directly adjacent to each other; the first face, the second face, and the fourth face are all configured to reflect light in different directions; and the plurality of microstructure pairs define a first angle gradient ($\Delta\alpha$) of about 0.01 degrees/millimeter (°/mm) to about 0.08°/mm moving across the structured surface and a second angle gradient angle ($\Delta\beta$) of about 0.01°/mm to about 0.08°/mm moving across the structured surface.

In some examples, the disclosure describes a display device that includes a first light source and a second light source having differently oriented light distributions, and an asymmetric turning film having a first major surface and a structured surface, where the first major surface defines a display axis extending perpendicular to the first major surface, and where the structured surface comprises a plurality of microstructure pairs formed across the structured surface. In some examples of the display device, each of the plurality of microstructure pairs includes a first microstructure including a first face and a second face intersecting at a first crest, where the first microstructure defines a first microstructure width ($W_1$) measured perpendicular with the display axis, and where the first face preferentially reflects light from the first light source and the second face preferentially reflects light from the second light source, and a second microstructure including a third face and a fourth face intersecting at a second crest, where the second microstructure defines a second microstructure width ($W_2$) measured perpendicular with the display axis, and where the third face preferentially reflects light from the first light source and the fourth face preferentially reflects light from the second light source, where the first microstructure and the second microstructure are directly adjacent to each other, where the first face, the second face, and the fourth face are all configured to reflect light in different directions, and where the microstructure pair defines a width ratio ($W_R$) equal to $W_1/W_2$, where the plurality of microstructure pairs define a width ratio gradient ($\Delta W_R$) of about 0.2/micrometer ($\mu$m) to about 1.3/$\mu$m moving across the structured surface.

In some examples, the disclosure describes a display device that includes a first light source and a second light source having differently oriented light distributions and an asymmetric turning film including a first major surface and a structured surface, where the first major surface defines a display axis extending perpendicular to the first major surface, where the structured surface comprises a plurality of microstructures formed across the structured surface. In some examples of the display device, each microstructure includes a first side including a first face, where the first face preferentially reflects light from the first light source, and a second side including a second face and a third face, where the second face and the third face each preferentially reflect light from the second light source, where the first face and the second face intersect at a crest, where the microstructure defines a microstructure axis extending from the first crest and equally splitting an angle between the first face and the second face, where the microstructure axis and the display axis define a first angle ($\alpha$), and where the first face, the second face, and the third face are all configured to reflect light in different directions. In some examples of the display device, the plurality of microstructures define a first angle gradient ($\Delta\alpha$) of about 0.01 degrees/millimeter (°/mm) to about 0.08°/mm moving across the structured surface.

In some examples, the disclosure describes a display device that includes a first light source and a second light source having differently oriented light distributions, and an asymmetric turning film including a first major surface and a structured surface, where the first major surface defines a display axis extending perpendicular to the first major surface, where the structured surface includes a plurality of microstructures formed across the structured surface, where each microstructure of the plurality of microstructures includes a first side having a first face, wherein the first face preferentially reflects light from the first light source, and a second side having a second face and a third face, where the second face and the third face each preferentially reflect light from the second light source. In some examples of the display device, the first face and the second face intersect at a crest, with the first face, the second face, and the third face are all configured to reflect light in different directions, where the microstructure defines a microstructure width (W) measured perpendicular with the display axis, where the asymmetric turning film defines a change in the respective microstructure widths (ΔW) of the plurality of microstructures as a function of position on the asymmetric turning film.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes asymmetric turning films (ATFs) that may be used in conjunction with multiple light sources in a liquid crystal display assembly to provide multiple different characteristic output distributions of light. In some examples, the different output distributions of light may be used to create an on-axis output distribution directed to a primary viewer position and a split lobed off-axis output distribution directed to a wider public/peripheral viewing position. In some examples, the on-axis and off-axis output distributions can be used to establish a private view display (e.g., the on-axis distribution) and a public or non-private view display (e.g., the off-axis view display). Additionally or alternatively, the ATFs may be used in conjunction with multiplexing display to deliver different images to different viewing positions, for example, a primary image to an on-axis viewing position and a second image to an off-axis viewing position.

Figure 1A:
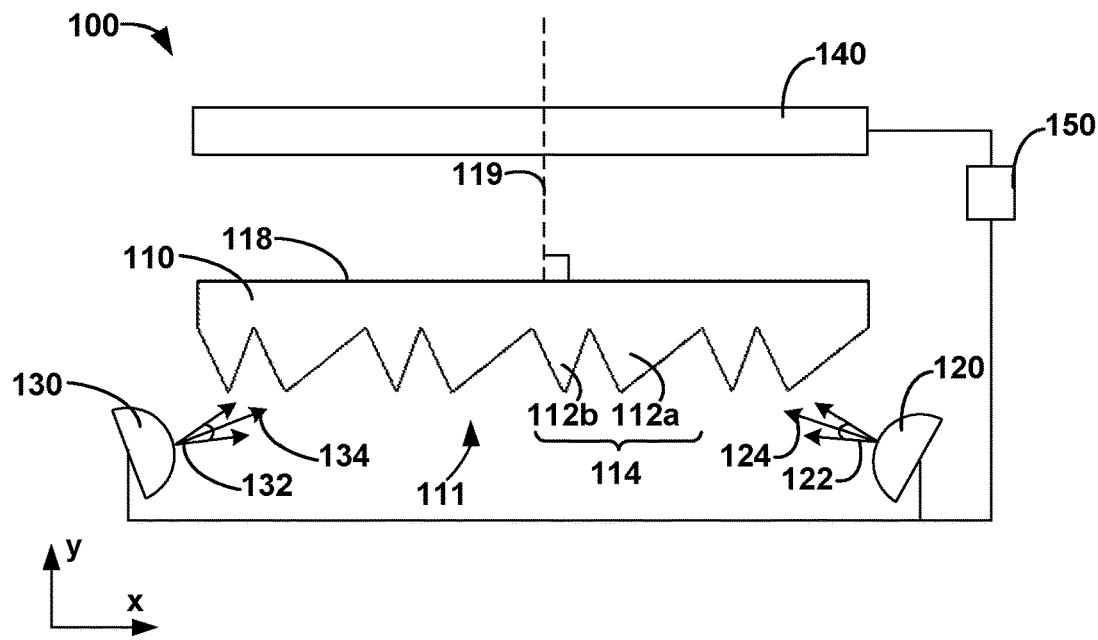
FIG. 1A is a schematic elevation cross-section of an example display assembly that includes a first light source and a second light source having differently oriented light distributions respectively and an asymmetric turning film (ATF) positioned to receive light from the first and second light sources

The ATFs described herein, may have a plurality of microstructures (e.g., prism), each having at least two faces that are configured to preferentially reflect light from different light sources in different directions. In some examples, the plurality of microstructures may be considered a plurality of microstructure pairs that collectively produce two different light output distributions. For example, FIG. 1A is a schematic elevation cross-section of display assembly 100 that includes a first light source 120 and a second light source 130 having differently oriented light distributions 122, 132 respectively and an asymmetric turning film (ATF) 110 positioned to receive light from first and second light sources 120, 130. Display assembly 100 may also include a liquid crystal display unit (LCD 140) and a controller 150. As described further below, controller 150 may be configured to drive LCD 140 in conjunction with first and second light sources 120, 130 to function as a multiplexing display. For example, controller 150 may be configured to rapidly switch LCD 140 between a primary display image illuminated via first light source 120 and a secondary display image illuminated via second light source 130.

ATF 110 may include a first major surface 118 and a second major surface opposite surface 118 that is composed of a plurality of microstructure pairs 114. Each microstructure pair 114 may include a first microstructure 112a and a second microstructure 112b adjacent to one another. Each of the respective microstructures (e.g., first microstructure 112a and second microstructure 112b) may be linear microstructures (e.g., prisms) that extend in substantially the same direction of ATF 110 (in the exemplary configuration of FIG. 1A, along the axis into/out of the page).

In some examples, first major surface 118 may be substantially smooth (e.g., flat or nearly flat) defining a display axis 119 that extends perpendicular to first major surface 118. However, the surface need not be completely smooth in all examples, and may qualify as a substantially smooth surface as long as the surface does not contain microstructures. For example, an anti-wetout or anti-glare beaded coating may be included or incorporated on major surface 118, and such a surface may still be considered substantially smooth for the purposes of this application. In other words, smooth is not used in the sense of not rough; instead, it is used in the sense of not structured. In some examples, first major surface 118 may be positioned adjacent to LCD 140 such that display axis 119 and a display axis of LCD 140 are substantially aligned. Display axis 119 may be substantially aligned (e.g., aligned or nearly aligned) with the normal to the display surface of display assembly 100. Thus, display axis 119 may be considered to be the same as the display axis for display assembly 100.

Figure 1B:
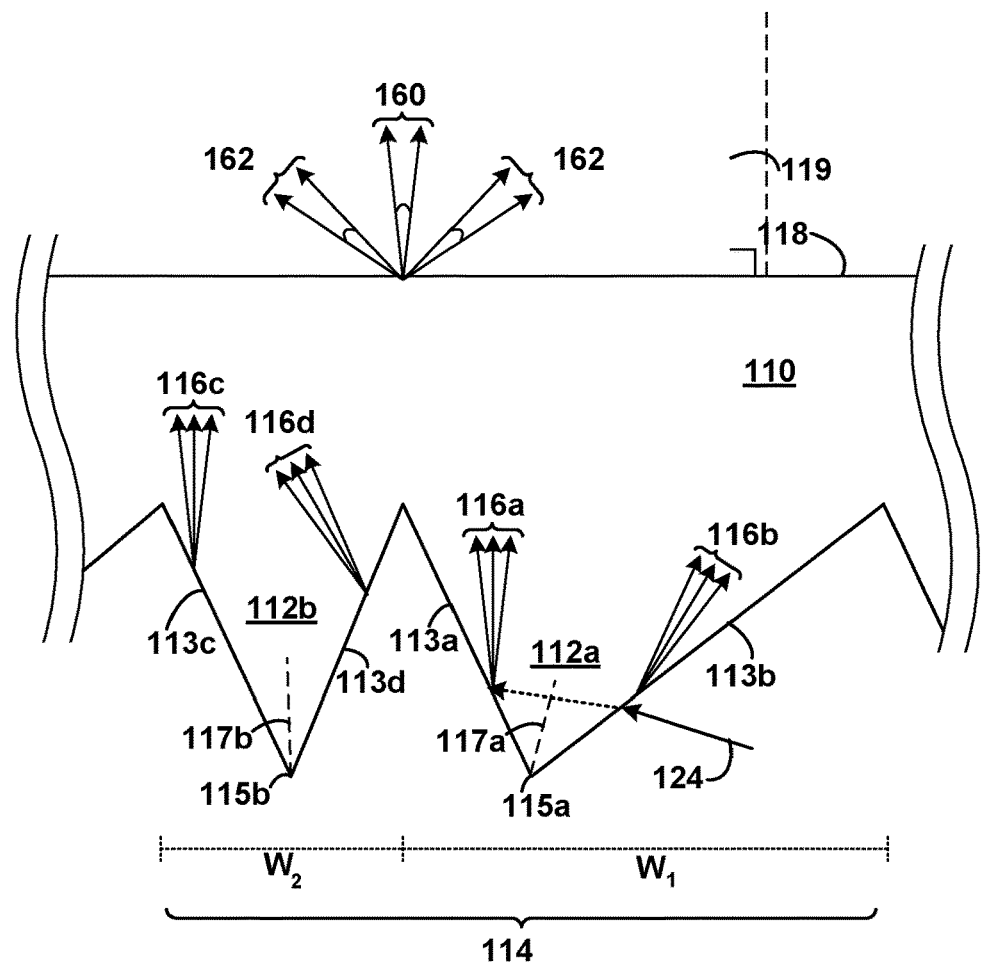
FIG. 1B is an enlarged schematic cross-section view of a portion of the ATF of FIG. 1A showing a single microstructure pair.

FIG. 1B is an enlarged schematic cross-section view of a portion of ATF 110 showing a single microstructure pair 114 that includes first microstructure 112a and second microstructure 112b. As shown, first microstructure 112a may include a first face 113a and a second face 113b that intersect to form a first crest 115a. In some examples, first face 113a may positioned such that light from first light source 120 incident on first microstructure 112a is preferentially reflected by first face 113a towards LCD 140 (e.g., substantially all light from first light source 120 incident on first microstructure 112a is reflected by first face 113a apart from light lost due to scattering or other loss associated with inefficiencies of display assembly 100). For example, first light source 120 produces first light distribution 122, which may be characterized by a first collimation angle (e.g., the angular range/spread of first light distribution 122) that includes a first exemplary light ray 124. As shown in FIG. 1B, first exemplary light ray 124 may enter first microstructure 112a through second face 113b. ATF 110 may have an index of refraction higher that the medium directly adjacent to structured (e.g., air), thus light traveling from the air into the turning film (e.g., exemplary light ray 124 incident on second face 113b) will be refracted but not substantially reflected by the face of entry (e.g., second face 113b), except from Fresnel reflections at the interface. After entering second face 113b, light ray 124 transports through first microstructure 112a and reflects by total internal reflection off first face 113a. In some such examples, the light reflected by first face 113a may be reflected towards an on-axis (e.g., in relation to display axis 119) viewing position within a set of characteristic viewing angles that form a first output distribution 116a. In some such examples, potential Fresnel reflections may be reduced by providing an anti-reflection coating or treatment on structured surface 111 of ATF 110. In some examples, anti-reflection may be provided by an antireflective structured surface 111, such as a moth's eye structure or the like.

Similarly, second face 113b may positioned such that light from second light source 130 incident on first microstructure 112a (e.g., incident on first face 113a) is preferentially reflected by second face 113b towards LCD 140 (e.g., substantially all light from second light source 130 incident on first microstructure 112a is reflected by second face 113b apart from light lost due to scattering other loss associated with inefficiencies of display assembly 100). In some such examples, the light reflected by second face 113b may be reflected towards an off-axis viewing position (e.g., in relation to display axis 119) within a set of characteristic off-axis viewing angles that form a second output distribution 116b.

Similar to first microstructure 112a, second microstructure 112b may include a third face 113c and a fourth face 113d that intersect to form a second crest 115b. In some examples, third face 113b may positioned such that light from first light source 120 incident on second microstructure 112b (e.g., incident on fourth face 113d) is preferentially reflected by third face 113c towards LCD 140 (e.g., substantially all light from first light source 120 incident on second microstructure 112b is reflected by third face 113c apart from light lost due to loss or scattering associated with inefficiencies of display assembly 100). In some such examples, the light reflected by third face 113c may be reflected towards an on-axis (e.g., in relation to display axis 119) viewing position within a set of characteristic viewing angles that form a third output distribution 116c. Similarly, fourth face 113d may positioned such that light from second light source 130 incident on second microstructure 112b (e.g., incident on third face 113c) is preferentially reflected by fourth face 113d towards LCD 140 (e.g., substantially all light from second light source 130 incident on second microstructure 112b is reflected by fourth face 113d apart from light lost due to loss or scattering associated with inefficiencies of display assembly 100). In some such examples, the light reflected by fourth face 113d may be reflected towards an off-axis viewing position (e.g., in relation to display axis 119) within a set of characteristic off-axis viewing angles that form a fourth output distribution 116d.

In some examples, the different faces of a respective microstructure pair 114 may be used to establish the different on-axis and off-axis viewing images. For example, first and third output distributions 116a, 116c associated with light from first light source 120 being preferentially reflected by first and third faces 113a, 113c, may combine to establish a primary light output distribution 160 directed to an on-axis viewing position. Additionally or alternatively, second and fourth off-axis output distributions 116b, 116d associated with light from second light source 130 being preferentially reflected by second and fourth faces 113b, 113d, may be combined to establish a split-lobed secondary light output distribution 162, with second and fourth output distributions 116b, 116d forming the two independent lobes of split-lobed secondary light output distribution 162.

Figure 2A:
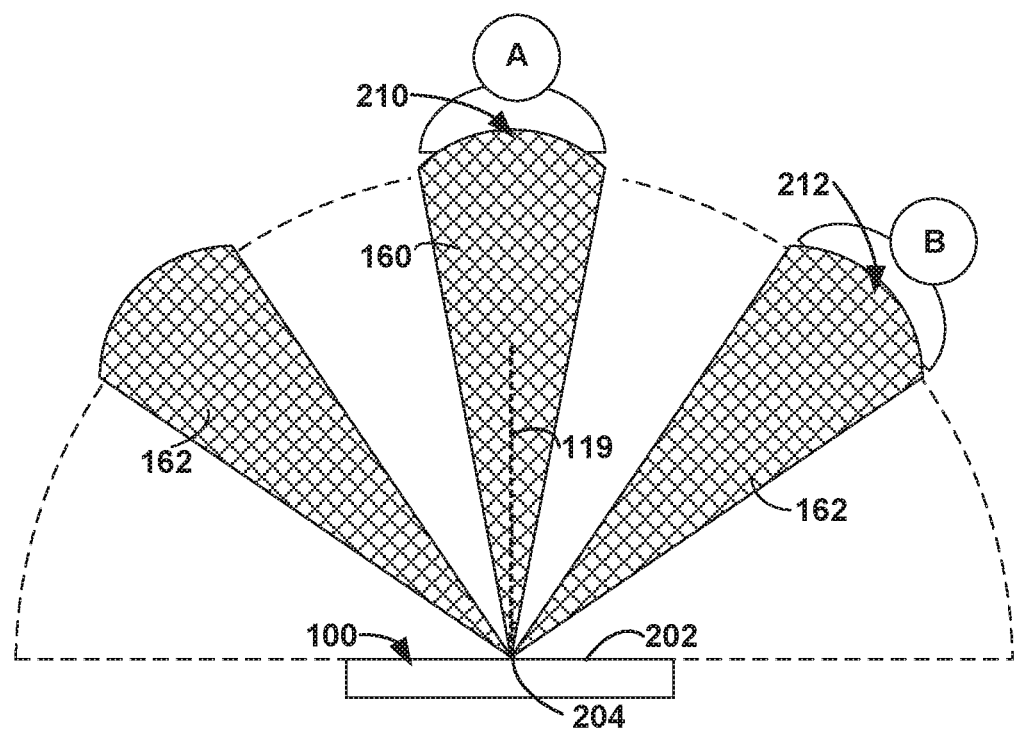
FIG. 2A is a schematic image of an example image projection for the display assembly of FIG. 1A.
Figure 2B:
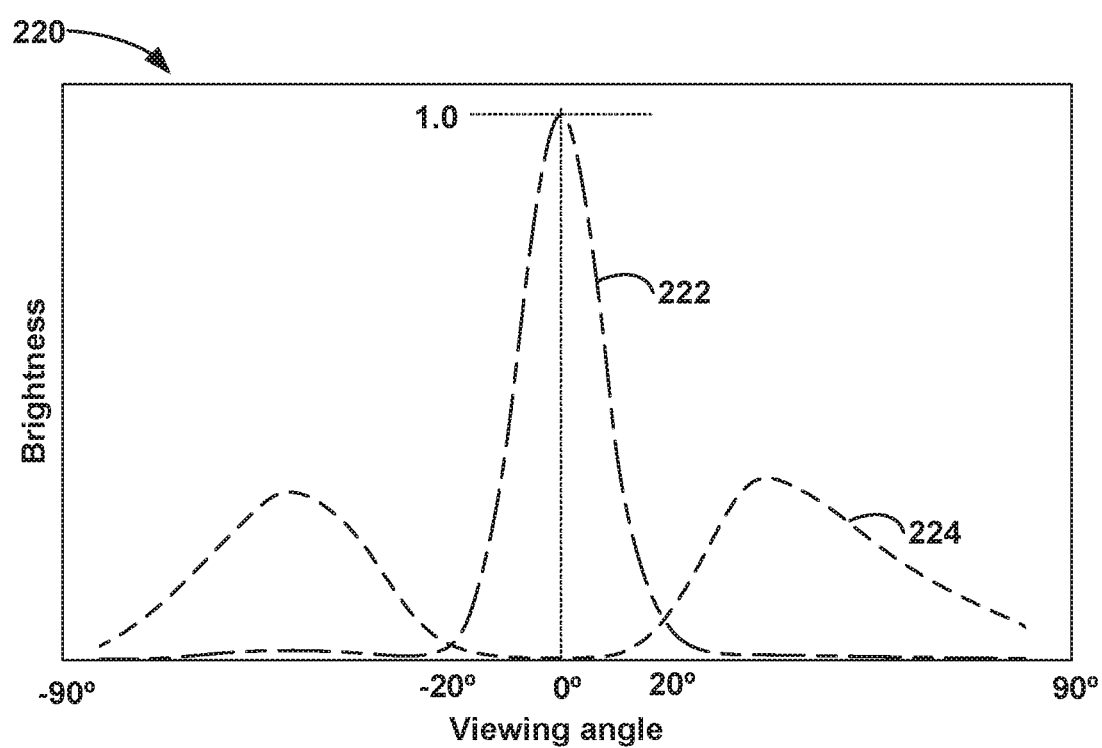
FIG. 2B is an example brightness plot of the display assembly of FIG. 1A as measured at the center position of the display surface.

In some examples, primary light output distribution 160 and split-lobed secondary light output distribution 162 may be used to establish at least two different visual experiences for viewers standing at different positions relative to the display assembly 100. For example, FIGS. 2A and 2B show examples of the light output distributions of ATF 110. FIG. 2A is a schematic image of an example image projection for display assembly 100. As shown display assembly 100 may define a display surface 202 directed towards Viewers A and B. Viewer A may be positioned at a primary viewing position 210 relative to display surface 202 and Viewer B represents a position within an off-axis viewing position 212. In some examples, primary viewing position 210 may be aligned with the middle of display surface 202 and display axis 119. Depending on the type of display device, primary viewing position 210 may be between 30 centimeters (cm) (e.g., for a tablet display) and 200 cm (e.g., for a large monitor) from display surface 202.

As shown in FIG. 2A primary light output distribution 160 may be directed to primary viewing position 210 relative to the display surface 202, while split-lobed secondary light output distribution 162 may be directed to off-axis viewing positions that include position 212. Primary light output distribution 160 and split-lobed secondary light output distribution 162 may each define a characteristic set of viewing angles. For example, primary light output distribution 160 directed to primary viewing position 210 may define a characteristic set of viewing angles within the distribution range of −20 degrees to +20 degrees as measured from display axis 119 (e.g., 0 degrees representing alignment with display axis 119). In some examples the distribution width (e.g., spread) of primary light output distribution 160 may be about 10 degrees to about 40 degrees. Split-lobed secondary light output distribution 162 may include of a characteristic set of viewing angles within the distribution range of −90 degrees to −20 degrees for one lobe and +20 degrees to +90 degrees for the other lobe as measured from display axis 119 (e.g., areas outside of primary light output distribution 160). The characteristic set of viewing angles for primary light output distribution 160 and split-lobed secondary light output distribution 162 may vary widely depending on the desired application. The edges of a set of characteristic viewing angles may be defined as a point where light intensity drops to half of a maximum (FWHM), or it may be where it crosses a threshold of perceptibility, readability, or even a different arbitrary value for light intensity.

FIG. 2B is an example brightness plot 220 of display assembly 100 as measured at the center position of display surface 202 (e.g., with respect to position 204 of FIG. 2B). The brightness distribution is measured as a function of viewing angle from display axis 119, with zero degrees representing parallel alignment with display axis 119 (e.g., viewing display surface 202 head-on) and ±90 degrees representing perpendicular alignment with display axis 119 (e.g., viewing display surface 202 from the side). Primary light output distribution 160 forms brightness curve 222 illustrating that primary light output distribution 160 is substantially projected within a ±20 degrees such that the primary display may only be observed by Viewer A within a ±20 degrees viewing angle and not observer by Viewer B in the off-axis viewing position. Likewise, split-lobed secondary light output distribution 162 forms brightness curve 224 illustrating that split-lobed secondary light output distribution 162 is substantially projected within a −90 to −20 degrees and +20 to +90 degrees viewing angle such that the secondary display may only be observed by Viewer B within the ±20-90 degrees viewing angle and is not observed by Viewer A.

ATF 110 may be any suitable thickness and may be made from any suitable material. In some examples, ATF 110 may be formed from a polymeric material, such as polycarbonate, polyethylene terephthalate, polyethylene naphthalate, poly(methyl methacrylate) and copolymers and blends of the same. In some examples, ATF 110 may be optically transparent or have low haze and high clarity to avoid undesirably scattering incident light. In some examples, ATF 110 may have a sufficiently high index of refraction, such as 1.5 or greater, to ensure that total internal reflection occurs at a sufficiently broad range of angles. In some examples, ATF 110 may be formed of other appropriate materials including, for example, acrylics, polystyrenes, methyl styrenes, acrylates, polypropylenes, polyvinyl chlorides, and the like. In some examples, the material, dimensions, or both of ATF 110 may be selected in order to produce a flexible film.

Plurality of microstructure pairs 114, and more generally, the structured surface of ATF 110 may be formed through any suitable process, such as a microreplication process. For example, the structured surface composed of plurality of microstructure pairs 114 may be formed through cutting (fly cutting, thread cutting, diamond turning or the like) a suitable tool with the negative of the desired structure and pressing a compliant but curable or hardenable material against the tool surface wherein the tool is periodically rotated/canted during the cutting process to establish the angle gradients described above. The material may be subsequently hardened or cured (for example, through exposure to light such as ultraviolet light), leaving the structured surface with the desired microstructure pairs 114. Other processes may be possible, including casting and curing with an electroplated, laser cut, or etched tool, using photolithography such as two-photon mastering of a tool in conjunction with a cast and cure process, or even direct machining or an additive three-dimensional printing process.

Each respective microstructure face may define a surface shape. For example, first face 113a, second face 113b, third face 113c, and fourth face 113d, each respectively define a first, second, third, and fourth surface shape. In some examples, the respective surface shapes may be substantially planar (e.g., smooth or flat as depicted in FIG. 1B). Additionally or alternatively, one or more of the respective faces may have a non-planar surface shape including, for example, parabolic, hyperbolic, elliptical, curved, wavy, or combinations thereof. Engineered surface shapes are possible on any of the faces of the microstructures including, for example, sawtooth, alternating parabolic, sinusoidal, or microfeatured (including, for example, microlenses) shapes.

In some examples, the relative shape of the respective face may be used to tailor or modify the distribution angle of one or more of the on-axis or off-axis light output distributions 116a, 116b, 116c, 116d. In some examples, the relative shape of the respective face may be modified to produce a more collimated or a spread light output distribution compared to that obtained with a planar shape. For example, second and fourth faces 113b and 113d producing off-axis output distributions 116b and 116d respectively may define a second and fourth surface shape that is wavy (e.g., sinusoidal, parabolic, arcuate, sawtooth, structured, or any continuously curved shape (e.g. Bezier curve)). Depending on the magnitude of the wavy shape of the respective face, the light output distribution will become more spread such that the respective off-axis output distribution defines a larger range of characteristic viewing angles (e.g., between about −90° and about −20° for fourth output distribution 116d as measured from display axis 119). Additionally or alternatively, to minimize scattering, antireflective coatings may be placed on one or more of respective faces of microstructure pairs 114, the backside of ATF 110, or even on other components of the display assembly 100.

Each microstructure (e.g., first microstructure 112a) may define any appropriate size (e.g., width (W)), and in many cases may be on the millimeter or micrometer scale. In some examples, each microstructure may define a width (e.g., W1 or W2 of FIG. 1B for first and second microstructures 112a, 112b respectively) between about 10 micrometers (μm) and 300 μm such that each respective microstructure pair 114 defines pair width (i.e., W12=W1+W2) between about 20 μm and 600 μm. In some examples, the width of each respective microstructure (e.g., W1 or W2) may be between about 10 μm and 100 μm establishing a pair width (W12) between about 20 μm and 200 μm.

In some examples, the respective microstructure widths (e.g., $W_1$ or $W_2$) and pair width ($W_{12}$) may remain substantially constant (e.g., constant or nearly constant) across the structured surface of ATF 110 such that the widths of the respective microstructures are not intentionally varied or altered across the structured surface of ATF 110.

In other examples, the respective microstructure widths (e.g., $W_1$ or $W_2$) of first microstructure 112a and second microstructure 112b may change as a function of position along structured surface 111 (e.g., moving perpendicularly across plurality of microstructure pairs 114 in the x-axis direction of FIG. 1A) while keeping the basic shape and angle between the respective faces of the microstructure substantially constant (e.g., constant or nearly constant. In some such examples, the change in the respective microstructure widths (e.g., $W_1$ or $W_2$) as a function of position on ATF 110 may be used to counteract potential shadowing effects where an adjacent microstructure may shadow the ability of light from first or second light sources 120, 130 reaching the respective microstructure. For example, with respect to FIG. 1A, less light from first light source 120 may be directed to microstructures on the opposite end of ATF 110 (e.g., left side of the page) due to the oblique angles and shadowing effects created by adjacent microstructures. As a result, the side of display surface 202 opposite first light source 120 may have a reduced brightness compared to the side adjacent to first light source 120. By altering respective microstructure widths (e.g., $W_1$ or $W_2$) as a function of position on ATF 110, the relative heights and thus the area of the respective face (e.g., second face 113b and fourth face 113d) is increased to allow for more light from first light source 120 to be received by the respective microstructure. In some examples, the shadowing effect can be addressed by changing the width ratio ($W_R=W_1/W_2$) as function of position ATF 110 while keeping the pair width ($W_{12}$) substantially constant. Suitable changes/gradient in width ratio ($\Delta W_R$) may be about 0.2/micrometer (μm) to about 1.3/μm moving across the structured surface. In some examples, the change of width ratio ($\Delta W_R$) may be about 0.5/μm to about 0.6/μm as measured in the direction moving away from first light source 120. In some examples, changing the width ratio ($\Delta W_R$) as a function of position ATF 110 may be used in conjunction with rotating the microstructures as a function of position ATF 110, which is described further below with respect to FIG. 6.

In some examples, the overall arrangement plurality of microstructure pairs 114 on the structured surface of ATF 110 may be set so microstructure pairs 114 extend continuously across the structured surface of ATF 110 (e.g., substantially parallel to display axis 119) such that microstructure pairs 114 are directly adjacent to one another without the presence of land or gaps between plurality of microstructure pairs 114. In other examples, each microstructure pair 114 may be separated from adjacent pairs by a small piece of land (e.g., flat spot) separating the adjacent pairs, or the individual microstructures 112a, 112b may each be separated by a small piece of land (e.g., on the order of the width of a single microstructure).

The microstructure pairs 114 may be produced in any suitable pair pattern/arrangement. For example, microstructure pairs 114 are illustrated in FIG. 1A as having a repetitive microstructure pattern of -(AB)-(AB)-, however, other suitable patterns are also envisioned. For example, the relative position of the first and second microstructure 112a, 112b within a microstructure pair 114 may be periodically reversed creating an -(AB)-(BA)-(AB)- microstructure pattern or combinations thereof.

First light source 120 and second light source 130 may be any suitable light source or combination of light sources. In some examples, light sources for first light source 120 and second light source 130 may be light emitting diode (LED), a cold cathode fluorescent light (CCFL), an incandescent light source, or the like. In some examples, first and second light source 120, 130 may each be a series of light sources. For example, first and second light source 120, 130 may include a series of LEDs that extended along the axis into/out of the page if FIG. 1A. In some examples, first and second light sources 120 and 130 may emit substantially white light. Additionally or alternatively, certain of the components of a respective light source (e.g., first light source 120 or second light source 130) may emit light of different wavelengths that may together create white light. "White" light may refer to any suitable desirable color point that may be perceived as a viewer as white light and may be adjusted or calibrated depending on the application. In some examples, first light source 120 and/or second light source 130 may emit light in one or more of the ultraviolet range, the visible range, or the near-infrared range of the electromagnetic spectrum. The light sources and any corresponding injection, collimation, or other optics may be selected to provide any suitable wavelength or combination of wavelengths, polarizations, point spread distributions, and degrees of collimation.

As describe above, first and second light sources 120, 130 each produce differently oriented light distributions 122, 132. The degree of collimation of a respective distribution 122, 132 may depend on both the type of light source 120, 130 and any accompanying collimation or injection optics (for example, a lightguide) that may be used (not shown). In some examples, particularly when first or second light sources 120, 130 include a bank of parallel light sources, the light distribution cones or each independent light source may effectively merge to create an extended light wedge that forms light distributions 122, 132 (for example, as if the cross-section of the light distributions 122, 132 were projected into or out of the page in FIG. 1A). Additionally or alternatively, Light distributions 122, 132 may define an extended wedge in examples where the respective first or second light sources 120, 130 include linear light sources, such as a CCFL tube or an array of LEDs.

In some examples, because the light from second light source 130 is responsible for producing split-lobed secondary light output distribution 162, the independent lobes may have a perceived brightness less than that of primary light output distribution 160. For example, 100% of the theoretical light from first light source 120 will be projected within primary light output distribution 160, while each lobe of lobed secondary light output distribution 162 will independently include only 50% of the theoretical light from secondary light source 130. In order to compensate for the reduced brightness in split-lobed secondary light output distribution 162, in some examples, second light source 130 may be driven or configured to produce a higher light output than first light source 120, or less as needed for privacy or share mode performance.

LCD 140 may be any suitable liquid crystal panel including, for example, those readily and commercially available. LCD 140 may include any number of pixels or subpixels, including filters for displaying colors. LCD 140 and ATF 110 are in optical communication with each other, however, it is not necessarily that the two be directly, optically coupled to each other. For example, one or more intervening films or air gaps may exist between LCD 140 and ATF 110. In some examples, LCD 140 may include one or more reflective polarizers, absorbing polarizers, or light redirecting films. Additionally or alternatively, LCD 140 may include appropriate electronic driving components. In some examples, LCD 140 may have a sufficient number of pixels to support a high definition (HD) or ultra-high definition (UHD/4K/8K) display. LCD 140 may be a high transmission panel.

Figure 3A:
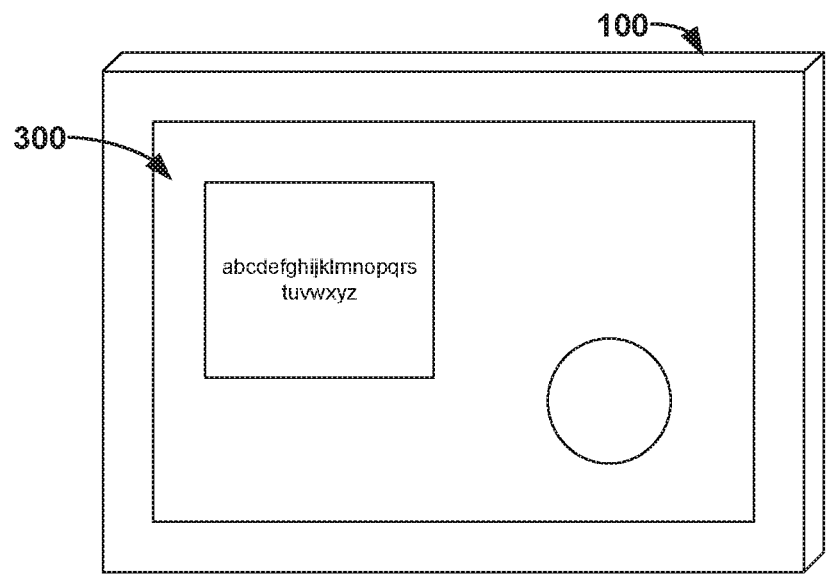
FIG. 3A is an example primary display images that may be shown by the display assembly of FIG. 1A.
Figure 3B:
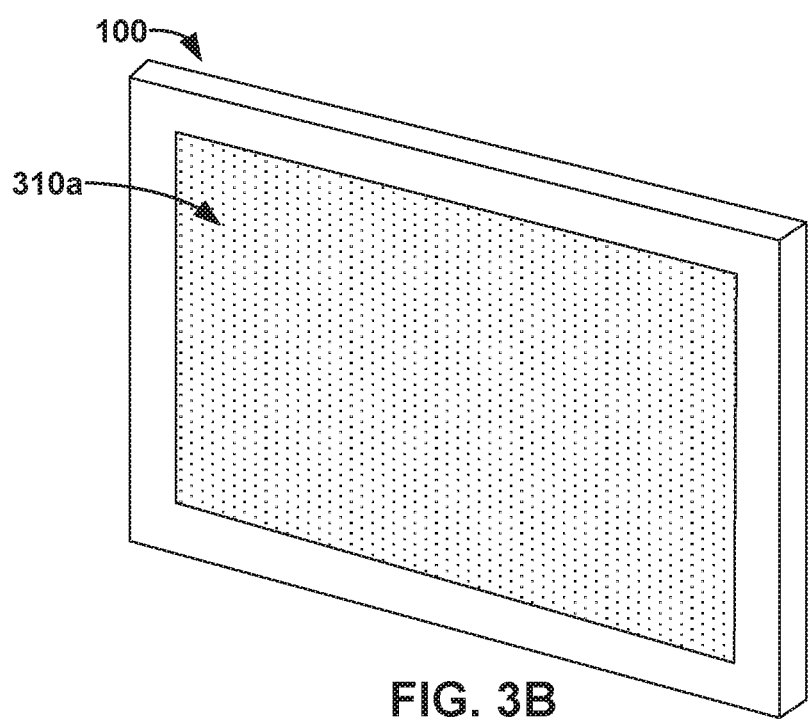
FIGS. 3B and 3C are example secondary display images that may be shown by the display assembly of FIG. 1A.
Figure 3C:
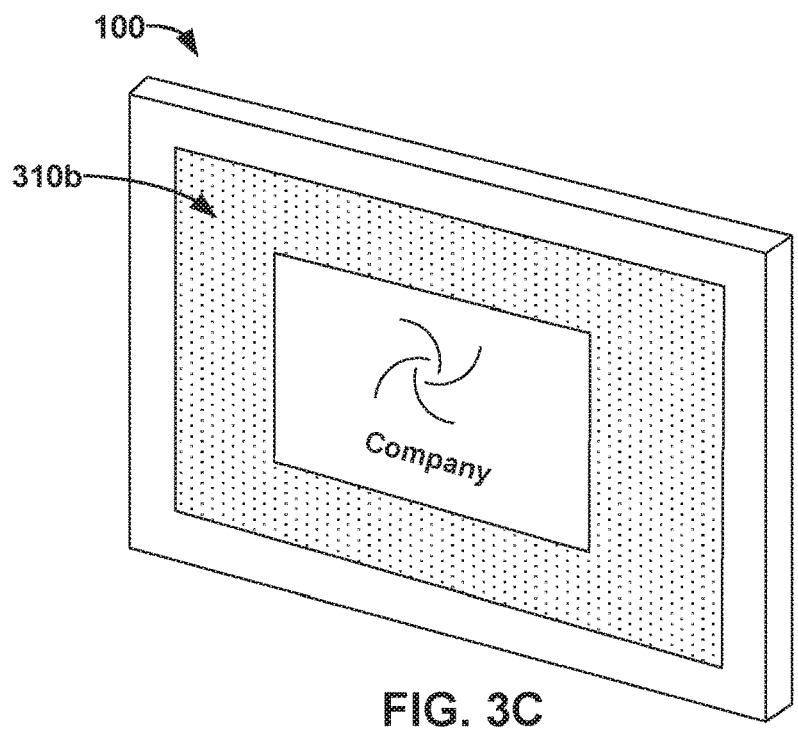

In some examples, LCD 140 may be capable of being very quickly switchable via controller 150 to rapidly switch between a primary image and a secondary image to provide different display images to Viewers A and B. FIGS. 3A, 3B, and 3C illustrate example primary display images 300 (FIG. 3A) and secondary display images 310a, 310b (FIGS. 3B and 3C) that may be shown by LCD 140 and observed by Viewers A and B respectively as a result of the multiplexing function of controller 150. In some examples, LCD 140 may be capable of frame durations of less than 10 milliseconds (ms), less than 8 ms, less than 4 ms, or even less than 1 ms. Similarly, first and second light sources 120, 130 may be capable of similar illumination durations where the respective light source switches between and illuminated and non-illuminated state. Controller 150 may be in electrical communication (whether wireless or not) with LCD 140, first light source 120, and second light source 130. Controller 150 may include or be a microcontroller or microprocessor. Controller 150 may include logic and appropriate input components. In general, controller 150 may be configured to coordinate the switching between a primary display image 300 and secondary display image 310a, 310b for LCD 140 with the selective illumination of first light source 120 (with the primary image) and second light source 130 (with the secondary image). For example, light from first light source 120 that is reflected by ATF 110 to form primary light output distribution 160 passes through LCD 140 during a primary state to project primary display image 300 at primary viewing position 210. Conversely, when LCD 140 is in a secondary state, light from second light source 130 that is reflected by ATF 110 to form split-lobed secondary light output distribution 162 passes through LCD 140 during a secondary state to project secondary display image 310a, 310b towards secondary viewing positions 212. In some examples, controller 150 may be configured to do this very quickly, switching between primary display image 300 and secondary display image 310a, 310b every 10 ms, 8 ms, 5, ms, 4 ms, 1 ms, or even quicker. In cases where the primary image is being displayed every other frame, the switching speed between the primary and secondary display states should be sufficiently quick to not be perceptibly choppy or disjointed by Viewer A.

By switching quickly between the primary and secondary display states, Viewer A within the range of primary light output distribution 160 will view primary image 300 but not perceive display of secondary image 310a, 310b nor the very brief effectively blank frame during the second display state. If at all, secondary display image 310a, 310b will appear very dim to View A within the range of primary light output distribution 160. Likewise, Viewer B within the range of split-lobed secondary light output distribution 162 will view secondary image 310a, 310b but not primary image 300, nor the very brief effectively blank frame during the primary display state. For situations where a viewer is within the range of split-lobed secondary light output distribution 162 but also near the range of primary light output distribution 160, that viewer may also be able to perceive dimly primary display image 300 as well as secondary display image 310a, 310b. For this reason, in some examples, secondary display image 310a, 310b may be selected or designed to be distracting or to render content difficult to read. For example, the secondary display image may be a dedicated image (e.g., image 310b) or a pseudorandom noise function secondary display image (e.g., image 310a). In some examples, secondary display image 310a, 310b may include a transforming or active display image to further distract Viewer B. Controller 150 may include appropriate electronic driving and timing circuitry to obtain the described primary and secondary display states including, for example, video inputs from other electronic components, such as a video card, that may provide the content of one or more of primary display image 300 and secondary display image 310a, 310b.

In some examples, display assembly 100 may be configured to also provide a non-private or general viewing mode. For example, LCD 140 may display a singular display image while first and second light sources 120, 130 are illuminated simultaneously or quickly switched as described above. In such examples, the display image of LCD 140 may be projected to both primary viewing position 210 and off-axis viewing positions 212. In this way, Viewers A and B may observer the same image.

Additionally or alternatively, display assembly 100 may be configured to also provide a pseudo-private viewing mode. For example, LCD 140 may display a singular display image but may selectively display certain portions or windows of the display image only during the illumination of first light source 120. In some such examples, the respective portion or window of the display image may only be perceivable by Viewer A within primary light output distribution 160.

Figure 4:
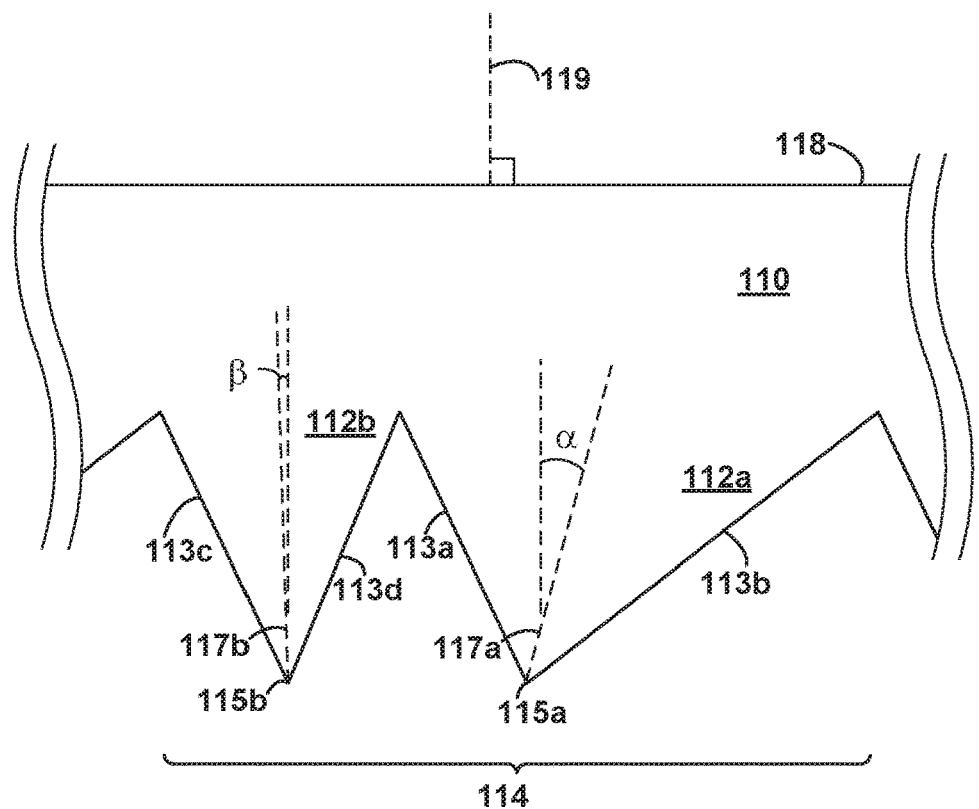
FIG. 4 is another enlarged schematic cross-section view of a portion of the ATF of FIG. 1A showing a single microstructure pair.

In some examples, each respective microstructure pair 114 may exhibit substantially the same alignment along structured surface 111. For example, each respective microstructure may be characterized by a microstructure axis that extends from the crest of the microstructure, bisecting the respective faces of the microstructure. FIG. 4 is another representative enlarged schematic cross-section view of a portion of ATF 110 showing a single microstructure pair 114 that includes first and second microstructures 112a, 112b. First microstructure 112a defines a first microstructure axis 117a that extends from first crest 115a and bisects first face 113a and second face 113b. A useful metric for defining the orientation of first microstructure is the angle ($\alpha$) between first microstructure axis 117a and display axis 119. Similarly, second microstructure 112b defines a second microstructure axis 117b and second microstructure angle (p8). In some examples, first microstructure angle ($\alpha$) and second microstructure angle (p8) may remain substantially constant for all microstructure pairs 114 across structured surface 111 of ATF 110. In some such examples, particularly with larger display assemblies or narrow collimation angles, primary display image 300 at primary viewing position 210 may become perceptively darker along the extreme edges of display surface 202.

Figure 5:
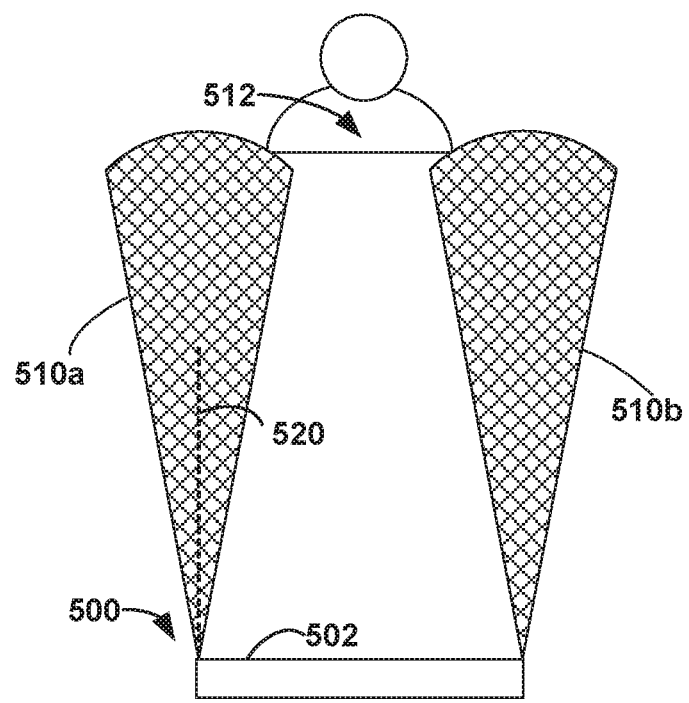
FIG. 5 is a schematic image of example image projection for a display assembly that includes an ATF with microstructure pairs that include a constant microstructure angles across the structured surface of the ATF.

This diminished illumination at the edges of display surface 202 may be the result of primary viewing position 210 being slightly off-axis relative to the extreme edges of display surface 202. For example, FIG. 5 shows schematic image of example image projection for display assembly 500 that includes an ATF with microstructure pairs that include a constant microstructure angles across the structured surface of the ATF. Light output distributions 510a and 510b represent the primary light output distributions at the extreme edges 530a, 530b of display surface 502. As shown, because primary viewing position 512 is slightly off-axis relative to display axis 520 at extreme edges 530a, 530b, only light at the fringes of light output distributions 510a and 510b reach Viewer C, while the majority of the light within light output distributions 510a and 510b is directed to non-optimal viewing positions.

Figure 6:
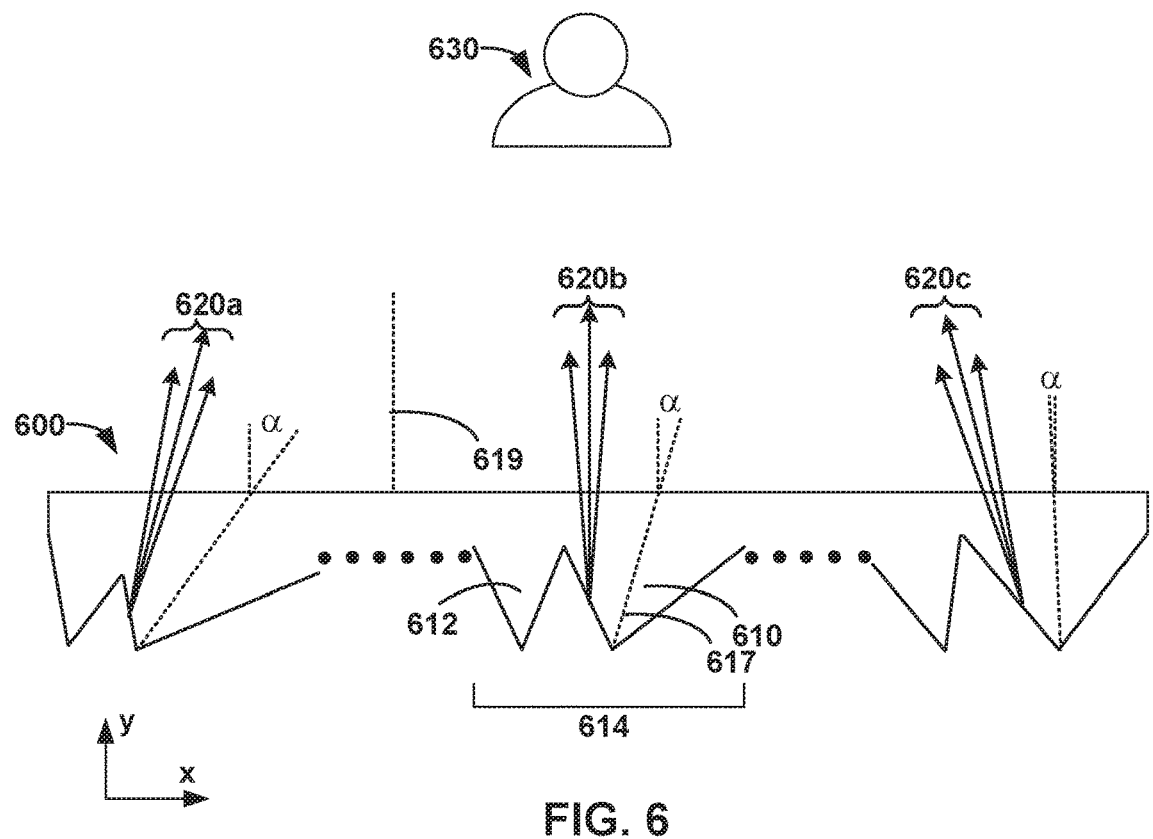
FIG. 6 is a schematic elevation cross-section of an ATF that includes a plurality of microstructure pairs.

In some examples, this diminished illumination effect may be reduced by gradually turning the respective microstructures moving across the structured surface of the ATF by adjusting the microstructure axis as a function of position along the ATF. For example, FIG. 6 is a schematic elevation cross-section of an ATF 600 that includes a plurality of microstructure pairs 614 that each include a first microstructure 610 and second microstructure 612 substantially the same as those described with respect to ATF 110. Each microstructure 610, 612 may be characterized by a respective microstructure axis (only first microstructure axes 617 are illustrated for the first microstructures 610 in FIG. 6 for simplicity). Moving perpendicularly across plurality of microstructure pairs 614 (e.g., in the x-axis direction), the respective microstructure axes of the microstructures may be rotated to create an angle gradient representing the change in angle between the respective first or second microstructure axes and display axis 619 of ATF 600 as a function of position across the ATF. For example, with respect to first microstructures 610, each microstructure defines a respective first microstructure axis 617, which respectively form a first angle ($\alpha$) as measured relative to display axis 619. Moving perpendicularly across plurality of microstructure pairs 614, the respective first angles (a) defined by first microstructures 610 change creating a first angle gradient moving in the x-axis direction ($\Delta\alpha$=degrees/millimeter).

In some examples, ATF 600 may define a first angle gradient ($\Delta\alpha$) relative to the rotation of the respective first microstructures 610 and a second angle gradient second angle gradient angle ($\Delta\beta$) relative to the second microstructures 612. In some examples, first angle gradient ($\Delta\alpha$) may be set so respective first output distributions 620a, 620b, 620c are each directed to primary viewing position 630 such that each first output distributions 620a, 620b, 620c is centered at primary viewing position 630. Likewise, second angle gradient ($\Delta\beta$) may be set so respective third output distributions (e.g., light reflected by third face 113c to form a portion of primary light output distribution 160 of FIG. 1B) from respective second microstructures 612 are each likewise directed to primary viewing position 630. In some examples, first angle gradient (Δα) and second angle gradient (Δβ) may be between about 0.01 degrees/millimeter (°/mm) and about 0.08°/mm measured with respect to the x-axis in FIG. 6 to account for the diminished illumination affects described with respect to FIG. 5. In some examples, first angle gradient (Δα) and second angle gradient (Δβ) may be between about 0.03 degrees/millimeter (°/mm) and about 0.05°/mm, between about 0.035 degrees/millimeter (°/mm) and about 0.045°/mm, and in some examples, between about 0.035 degrees/millimeter (°/mm) and about 0.037°/mm. In some examples, first angle gradient (Δα) and second angle gradient (Δβ) may be substantially the same (e.g., the same or nearly the same).

Figure 7:
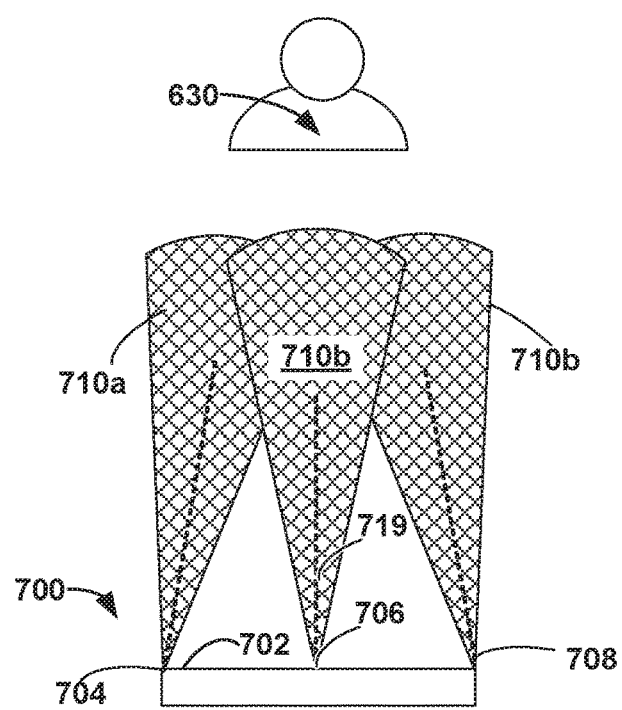
FIG. 7 is schematic image of example image projection for a display assembly that includes the ATF of FIG. 6.

In some examples, the angle gradient may be described with respect to the rotation of the respective first and second microstructure axes relative to the middle of the display surface. For example, FIG. 7 shows schematic image of example image projection for a display assembly 700 that includes ATF 600 and displays primary light output distributions 710a, 710b, and 710b for three characteristic positions on display surface 702. Primary light output distribution 710b corresponds to the middle position 706 of display surface 702 while primary light output distributions 710a, 710c, correspond to the extreme edge positions 704, 708 respectively of display surface 702. Primary light output distribution 710b at middle position 706 may be characterized as having a 0 degree shift in the microstructure axis relative to display axis 719. Primary light output distribution 710a at extreme edge 704 may be characterized as having about a +7 degree shift in microstructure axis relative to display axis 719. Similarly, primary light output distribution 710c at extreme edge 708 may be characterized as having about a −7 degree shift in microstructure axis relative to display axis 719. Collectively, first angle gradient (Δα) and second angle gradient (Δβ) may be characterized as having a about a 14 degree shift across the width of display surface 702.

In some examples, the first angle gradient (Δα) and second angle gradient (Δβ) may be gradual and substantially continuous across plurality of microstructure pairs 614. In other examples, the first angle gradient (Δα) and second angle gradient (Δβ) may be established by a step-change, where the first angle gradient (Δα) and second angle gradient (Δβ) defines an average change in the first and second angles across the entire ATF film (e.g., about 14 degrees over the entire width). Both examples are envisioned by the use of the term angle gradient.

Figure 8:
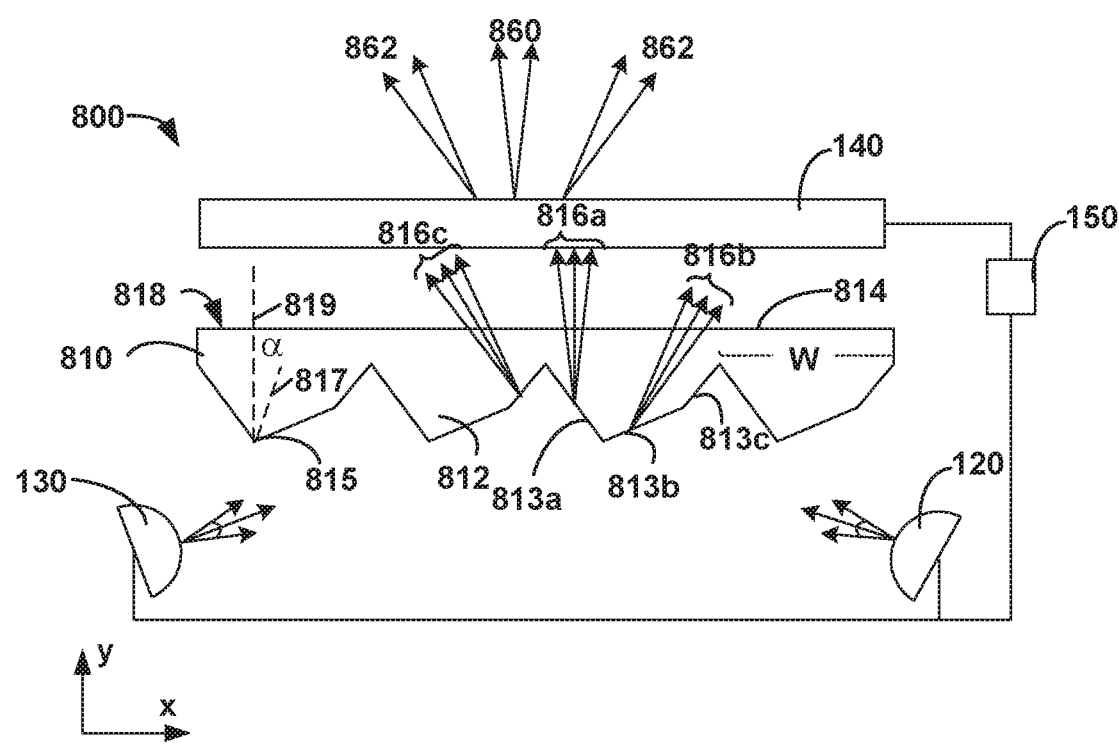
FIG. 8 is a schematic elevation cross-section of an example display assembly that includes ATF having a plurality of similarly shaped microstructures.

In some examples, the above features described with respect to a microstructure pairs may be combined into a single microstructure that defines at least three faces. For example, FIG. 8 is a schematic elevation cross-section of display assembly 800 that includes ATF 810 positioned to receive light from first and second light sources 120, 130. The respective components of display assembly 800, apart from ATF 810, may be substantially the same as those described with respect to display assembly 100 of FIG. 1A.

ATF 810 may include a first major surface 818 and a second major surface opposite surface 818 that is composed of a plurality of microstructures 812 each having a first face 813a configured to preferentially reflect light from first light source 120 towards a primary viewing position within a first output distribution 816a, a second face 812b configured to preferentially reflect light from second light source 130 towards an off-axis viewing position within a second output distribution 816b, and a third face 813c configured to preferentially reflect light from second light source 130 towards an off-axis viewing position within a third output distribution 816c towards. First face 813a functions substantially the same as combined first and third faces 113a, 113c of ATF 110, such that first output distribution forms primary light output distribution 860 directed to a primary viewing position. Likewise, the second face 813b functions substantially the same as second face 113b of ATF 110, and third face 813c functions substantially the same as fourth face 113d such that the combined second and third output distributions 816b, 816c form split-lobed secondary light output distribution 862 directed to off axis viewing positions.

As with ATF 600, each respective microstructure 812 of ATF 810 may be characterized by a microstructure axis 817 that extends from the crest 815 of the microstructure 812, bisecting the respective first and second faces 813a, 813b of the microstructure, with each respective microstructure axis 817 defining an angle (α) with respect to display axis 819. In some examples, ATF 810 define an angle gradient (Δα) representing the change in angle between the respective microstructure axes 817 and display axis 819 of ATF 810 as a function of position across the ATF. In some examples the angle gradient (Δα) may be about 14 degrees over the total width of ATF 810, for example, between about 0.01 degrees/millimeter (°/mm) and about 0.08°/mm measured with respect to the x-axis in FIG. 8.

Additionally or alternatively, the relative widths (W) of microstructures 812 may be varied as a function of position along structured surface of ATF 810 (e.g., moving perpendicularly across plurality of microstructures 812 in the x-axis direction of FIG. 8) while keeping the basic shape of microstructures 812 substantially constant (e.g., constant or nearly constant). In some such examples, the change in the respective microstructure widths (ΔW) as a function of position on ATF 810 may be used to counteract potential shadowing effects, help adjust for the reduction in usable face surface area due to angle gradient (Δα), or a combination of both. In some examples, the change in relative widths (W) may be characterized as a percentage difference between the microstructure widths at the extreme edges of ATF 810, e.g., the percentage difference between the widths of the smallest microstructure compared to the largest microstructure. In some such examples, ATF 810 may define between about an 2% width increase to about an 25% width increase across the entire width of ATF 810 depending on the relative distance of the primary viewing position. In examples where the primary viewing position relatively close to the display surface (e.g., 30 cm) the width increase may be closer to about 25% while in examples where the primary viewing position relatively far from the display surface (e.g., 200 cm) the width increase may be closer to about 2%. In some examples, the width increase for about a 32.5 cm wide display surface may be characterized as a change of about 0.007%/mm (e.g., for a 200 cm primary viewing position view), to about a 0.07%/mm (e.g., for a 30 cm primary viewing position). Additionally or alternatively, a higher width increase may be used for ATFs having microstructures 812 with larger refractive index. For example, for microstructures 812 with a refractive index of about 1.56 may have about an 8% width increase while microstructures 812 with a refractive index of about 1.64 may have about an 11% width increase across ATF 810 having about 325 mm width and set for about a 63 cm primary viewing position.

Various examples have been described. These and other examples are within the scope of the following claims.

What is claimed is:

1. A display device comprising:
a first light source and a second light source having differently oriented light distributions; and
an asymmetric turning film comprising a first major surface and a structured surface, wherein the first major surface defines a display axis extending perpendicular to the first major surface, and wherein the structured surface comprises a plurality of microstructure pairs formed across the structured surface, wherein each of the plurality of microstructure pairs comprises:
a first microstructure comprising a first face and a second face intersecting at a first crest, wherein the first microstructure defines a first microstructure axis extending from the first crest and equally splitting an angle between the first face and the second face, wherein the first microstructure axis and the display axis define a first angle (α), and wherein the first face preferentially reflects light from the first light source and the second face preferentially reflects light from the second light source, and
a second microstructure comprising a third face and a fourth face intersecting at a second crest, wherein the second microstructure defines a second microstructure axis extending from the second crest and equally splitting an angle between the third face and the fourth face, wherein the second microstructure axis and the display axis define a second angle (β), and wherein the third face preferentially reflects light from the first light source and the fourth face preferentially reflects light from the second light source,
wherein the first microstructure and the second microstructure having different shapes are directly adjacent to each other, and wherein the first face, the second face, and the fourth face are all configured to reflect light in different directions, wherein a peak reflection distribution of any one of the first, second or fourth faces is at least 20 degrees from a peak reflection distribution of any other of the first, second and fourth faces,
wherein the plurality of microstructure pairs define a first angle gradient (Δα) of the first angle of about 0.01 degrees/millimeter (°/mm) to about 0.08°/mm moving across the structured surface and a second angle gradient angle (Δβ) of the second angle of about 0.01°/mm to about 0.08°/mm moving across the structured surface,
wherein the display device defines a display surface having a normal substantially parallel to the display axis of the asymmetric turning film, and wherein for each of the plurality of microstructure pairs, light from the first light source reflected by both the first face of the first microstructure and the third face of the second microstructure produce a primary output distribution directed to a primary viewing position of the display surface, and
wherein for each of the plurality of microstructure pairs, the primary output distribution defines a distribution width of 10 degrees to 40 degrees.

2. The display device of claim 1, further comprising:
a liquid crystal panel comprising a plurality of pixels; and
a controller configured to independently drive the first light source, the second light source, and the liquid crystal panel;
wherein the controller is configured to rapidly switch the liquid crystal panel between a primary state and a secondary state; and
wherein the controller is configured to also rapidly switch the driving of the first light source and the second light source such that the liquid crystal panel is in the primary state in a case that the first light source but not the second light source is illuminated and the liquid crystal panel is in the secondary state in a case that the second light source but not the first light source is illuminated.

3. The display device of claim 1, wherein the primary viewing position is set between about 30 centimeters (cm) and about 200 cm from the display surface.

4. The display device of claim 1, wherein the first angle gradient (Δα) is set so respective primary output distributions of the plurality of microstructure pairs are directed to the primary viewing position.

5. The display device of claim 1, wherein for each of the plurality of microstructure pairs, light from the second light source reflected by the second face produces a first off-axis output distribution that comprises a first characteristic set of viewing angles between about −90 degrees and about −20 degrees as measured from the display axis, and light from the second light source reflected by the fourth face produces a second off-axis output distribution that comprises a second characteristic set of viewing angles between about +20 degrees and about +90 degrees as measured from the display axis.

6. The display device of claim 1, wherein each of the plurality of microstructure pairs define a pair width measured perpendicular with the display axis that measures a span across the first microstructure and the second microstructure, wherein the pair width of the plurality of microstructure pairs is substantially constant across the structured surface.

7. The display device of claim 1, wherein the second face and the fourth face are substantially non-planar.

8. The display device of claim 7, wherein the second face and the fourth face define at least one of a sawtooth, alternating parabolic, sinusoidal, microfeatured structured surface, arcuate, parabolic, or continuous curve.

9. A display device comprising:
a first light source and a second light source having differently oriented light distributions; and
an asymmetric turning film comprising a first major surface and a structured surface, wherein the first major surface defines a display axis extending perpendicular to the first major surface, and wherein the structured surface comprises a plurality of microstructure pairs formed across the structured surface, wherein each of the plurality of microstructure pairs comprises:
a first microstructure comprising a first face and a second face intersecting at a first crest, wherein the first microstructure defines a first microstructure width ($W_1$) measured perpendicular with the display axis and between one end of the first face and one end of the second face, and wherein the first face preferentially reflects light from the first light source and the second face preferentially reflects light from the second light source, and
a second microstructure comprising a third face and a fourth face intersecting at a second crest, wherein the second microstructure defines a second microstructure width ($W_2$) measured perpendicular with the display axis and between one end of the third face and one end of the fourth face, and wherein the third face preferentially reflects light from the first light source and the fourth face preferentially reflects light from the second light source, wherein the first microstructure and the second microstructure having different shapes are directly adjacent to each other, wherein the first face, the second face, and the fourth face are all configured to reflect light in different directions, and wherein the microstructure pair defines a width ratio ($W_R$) equal to $W_1/W_2$, wherein the plurality of microstructure pairs define a width ratio gradient ($\Delta W_R$) of the width ratio of about 0.2/micrometer (urn) to about 1.3/µm moving across the structured surface, wherein each of the plurality of microstructure pairs defines a pair width ($W_{1+2}$) equal to the first microstructure width ($W_1$) plus the second microstructure width ($W_2$), wherein the pair width ($W_{1+2}$) is between about 15 µm and about 500 µm, and wherein the pair width ($W_{1+2}$) of the plurality of microstructure pairs is constant across the structured surface.

10. The display device of claim 9, further comprising:
a liquid crystal panel comprising a plurality of pixels; and
a controller configured to independently drive the first light source, the second light source, and the liquid crystal panel;
wherein the controller is configured to rapidly switch the liquid crystal panel between a primary state and a secondary state; and wherein the controller is configured to also rapidly switch the driving of the first light source and the second light source such that the liquid crystal panel is in the primary state in a case that the first light source but not the second light source is illuminated and the liquid crystal panel is in the secondary state in a case that the second light source but not the first light source is illuminated.

11. The display device of claim 9, wherein the display device defines a display surface having a normal substantially parallel to the display axis of the asymmetric turning film, and wherein for each of the plurality of microstructure pairs, light from the first light source reflected by the first face of the first microstructure and the third face of the second microstructure produce a primary output distribution directed to a primary viewing position of the display surface.

12. The display device of claim 11, wherein for each of the plurality of microstructure pairs, the primary output distribution defines a distribution width of about 10 degrees to about 40 degrees.

13. The display device of claim 11, wherein for each of the plurality of microstructure pairs, light from the second light source reflected by the second face produces a first off-axis output distribution that comprises a first characteristic set of viewing angles between about −90 degrees and about −20 degrees as measured from the display axis, and light from the second light source reflected by the fourth face produces a second off-axis output distribution that comprises a second characteristic set of viewing angles between about +20 degrees and about +90 degrees as measured from the display axis.

14. The display device of claim 13, wherein the primary output distribution comprises a third characteristic set of viewing angles between about −20 degrees and about +20 degrees as measured from the display axis.

15. The display device of claim 9, wherein the second face and the fourth face are substantially non-planar.

* * * * *